United States Patent
Carson, Jr. et al.

(10) Patent No.: US 8,326,880 B2
(45) Date of Patent: Dec. 4, 2012

(54) SUMMARIZING STREAMS OF INFORMATION

(75) Inventors: Charles C. Carson, Jr., Cupertino, CA (US); Sean Andrew Suchter, Los Altos Hills, CA (US); David James Gemmell, Danville, CA (US)

(73) Assignee: Microsoft Corporation, Redmond, WA (US)

( * ) Notice: Subject to any disclaimer, the term of this patent is extended or adjusted under 35 U.S.C. 154(b) by 282 days.

(21) Appl. No.: 12/753,909

(22) Filed: Apr. 5, 2010

(65) Prior Publication Data
US 2011/0246463 A1 Oct. 6, 2011

(51) Int. Cl.
*G06F 17/00* (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS

| | | |
|---|---|---|
| 2008/0187231 A1 | 8/2008 | Barbieri et al. |
| 2009/0091443 A1 | 4/2009 | Chen et al. |
| 2009/0208180 A1* | 8/2009 | Ashby et al. .......... 386/52 |

OTHER PUBLICATIONS

Cao et al. "Density-Based Clustering over an Evolving Data Stream with Noise," Apr. 20-22, 2006, Retrieved at <<http://www.siam.org/meetings/sdm06/proceedings/030caof.pdf>>, pp. 326-337.
Hore et al. "Creating Streaming Iterative Soft Clustering Algorithms," Jul. 16, 2007, Retrieved at<<http://www.csee.usf.edu/~hall/papers/nafips07.pdf>>, pp. 5.
Baerecke et al. "Summarizing Video Information Using Self-Organizing Maps," Sep. 11, 2006, Retrieved at <<http://webia.lip6.fr/~baerecke/docs/Baerecke2006FUZZIEEE.pdf>>, pp. 7.
Hore, et al. "A Fuzzy C Means Variant for Clustering Evolving Data Streams ", Retrieved at <<http://ieeexplore.ieee.org/stamp/stamp.jsp?arnumber=04413710>>, 2007 IEEE, pp. 360-365.

(Continued)

*Primary Examiner* — Isaac M Woo
(74) *Attorney, Agent, or Firm* — Hope Baldauff Hartman, LLC

(57) ABSTRACT

Concepts and technologies are described herein for summarizing streams of information. A stream of information is obtained and analyzed. One or more entities are identified in the stream. The data in the stream is grouped into one or more clusters corresponding to the identified entities. The data in the clusters is summarized, and a timeline corresponding to the data in the cluster is determined. In some embodiments, a format can be selected for presentation of the summarized stream data. The data in the stream can be formatted in the selected format, and the summarized data can be presented in the selected format. In some embodiments, an update feature can be used to update the data in the summarized stream. The data in the stream can be updated, and the updated summarized stream can be formatted and presented.

19 Claims, 11 Drawing Sheets

OTHER PUBLICATIONS

Nassar, et al. "Effective Summarization of Multi-Dimensional Data Streams for Historical Stream Mining ", Retrieved at <<http://ieeexplore.ieee.org/stamp/stamp.jsp?arnumber=04274975>>, 19th International Conference on Scientific and Statistical Database Management (SSDBM 2007), 2007 IEEE, pp. 10.

Cao, et al. "Density-Based Clustering over an Evolving Data Stream with Noise ", Retrieved at <<http://www.siam.org/meetings/sdm06/proceedings/030caof.pdf>>, pp. 326-337.

Jiang, et al. "Data Stream Clustering and Modeling Using Context-Trees ", Retrieved at<<http://ieeexplore.ieee.org/stamp/stamp.jsp?arnumber=05175016>>, 2009 IEEE, pp. 932-937.

Hore, et al. "Creating Streaming Iterative Soft Clustering Algorithms", Retrieved at<<http://www.csee.usf.edu/~hall/papers/nafips07.pdf>>, pp. 5.

Barecke, et al. "Summarizing Video Information Using Self-Organizing Maps ", Retrieved at <<http://webia.lip6.fr/~baerecke/docs/Baerecke2006FUZZIEEE.pdf>>, pp. 7.

Yeh, Mi-Yen, "Clustering over Multiple Data Streams ", Retrieved at <<http://www.iis.sinica.edu.tw/~miyen/research.html>>, Jan. 13, 2010, pp. 4.

* cited by examiner

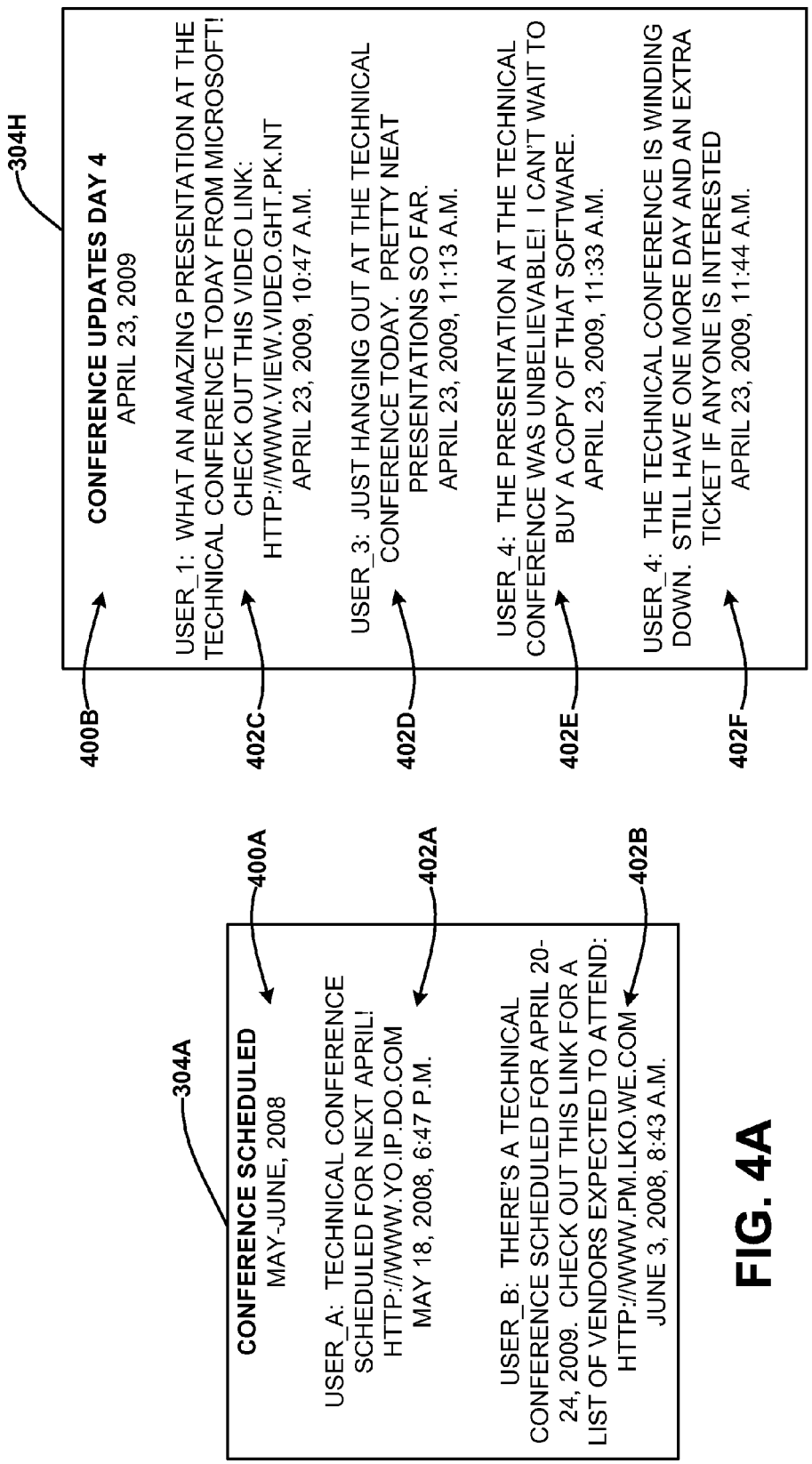

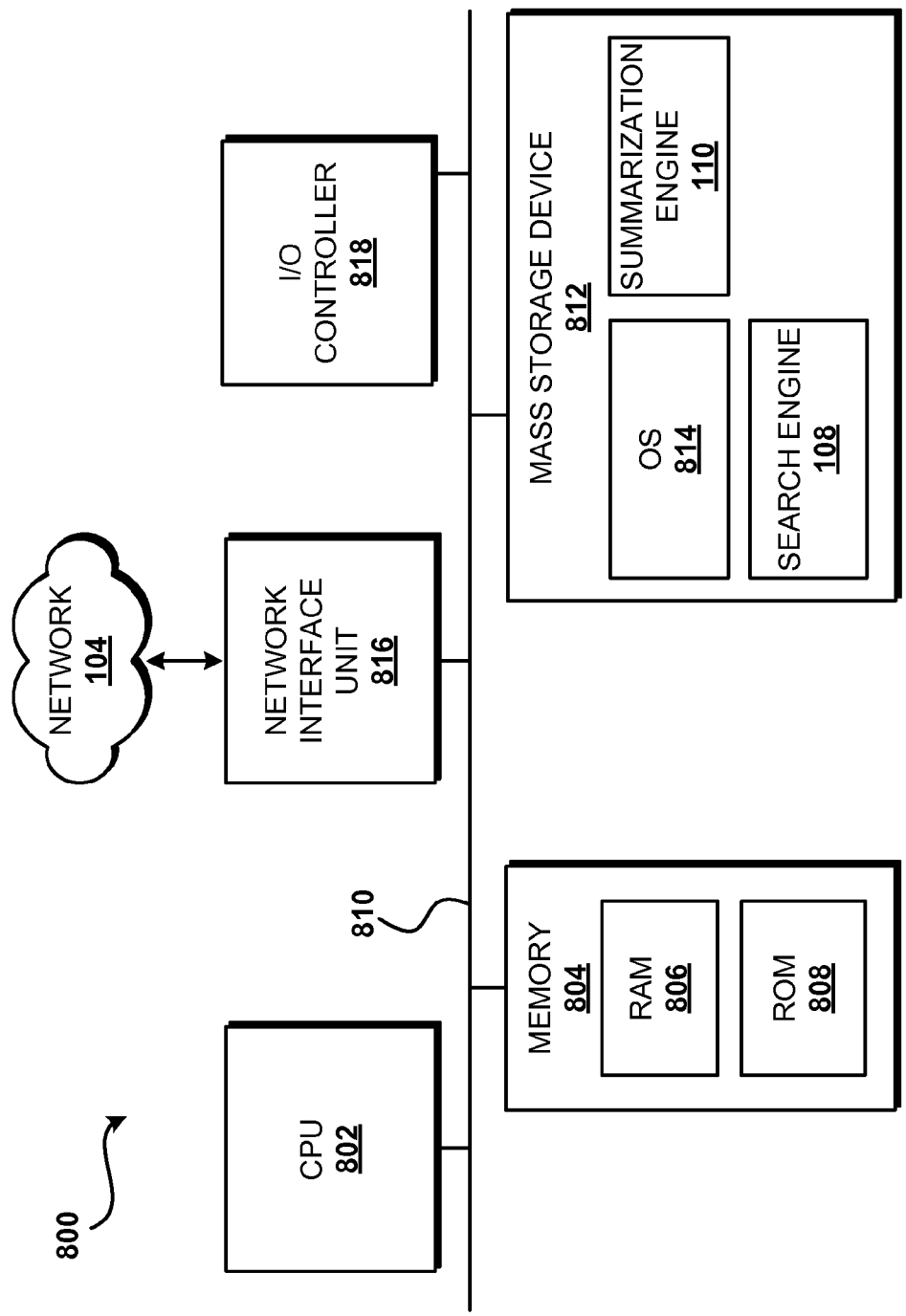

SUMMARIZING STREAMS OF INFORMATION

BACKGROUND

Commenting on and/or generating real-time messages or status updates relating to stories, events, personalities, topics, photographs, or other content via web logs ("blogs"), social networks, real-time messaging services, comment threads, comment boards, and other methods has become a popular aspect of Internet and network usage. In the case of the Internet, posting comments, real-time messages, status updates, stories, and/or other content via a blog, a wall associated with a social networking service, a real-time messaging service, and/or a comment thread allows a user to author and/or contribute content that may be seen by hundreds, thousands, or even millions of other people throughout the world. Social networking sites, real-time messaging sites, blogs, and comment sections of articles, news stories, blogs, and other sources may contain useful information relating to personalities, topics, keywords, events, locations, articles, news stories, blogs, and the like.

While social networking sites, real-time messaging sites, comment sections, comment threads, blogs, and/or other sources may provide new and useful information, these sources also may contain information that is of little interest and or relevance to a topic or story of interest. As such, a reader of social networking content, real-time messaging content, blog, comments sections and/or other sources may be unable to easily identify and/or understand the major points being made or who is saying what to whom, without reading through entire threads, blogs, walls, or other postings.

It is with respect to these and other considerations that the disclosure made herein is presented.

SUMMARY

Concepts and technologies are described herein for summarizing streams of information ("streams") and presenting the summarized streams. Streams are dynamic collections of data that are subject to change such as a blog postings, updated news events, comment sections of web sites, social network status updates, chat room data, user group updates, Really Simple Syndication ("RSS") feed data, combinations thereof, and the like. Streams also can include text, video, photographs, audio, and other data, all of which may be tagged with location data, time data, source data, and/or other metadata.

Streams also can be collections of streaming data such as all TWEETS relating to a particular topic using the TWITTER real-time messaging service, all status updates relating to a particular topic or submitted by a particular entity, all news stories relating to a particular topic or entity, as well as other collections of data. Thus, streams can include almost any type of data, stream of data, collections of data, and/or collections of data streams, and can include various forms of metadata such as time, location, source, and other data. Through the use of the technologies presented herein, a reader may be able to more easily understand a topic based upon all social networking information, news stories, web sites, blog postings, comments, TWEETS, and the like, that relate to the topic without searching for, locating, and reading all of the sources.

According to one aspect, the stream of information is obtained and analyzed. One or more portions of data are identified in the stream. The entity can include a subject of the stream such as, for example, a person, a social network, a news story, a topic, a location, a religion, a culture, and the like. The data in the stream is grouped into one or more clusters corresponding to the identified entities. The clusters can include two ore more data from the stream that are related to the same or a similar entity. The data in the clusters is summarized, and a timeline corresponding to the data in the cluster is determined.

According to another aspect, a format can be selected for presentation of the summarized stream data to a device or user. The data in the stream can be formatted in the selected format, and the summarized data can be presented to the device or user in the selected format. In some embodiments, an update feature can be used to update the data in the summarized stream. The data in the stream can be updated, and the updated summarized stream can be formatted and presented to the user or device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A-4B are user interface diagrams illustrating clusters, according to an exemplary embodiment of the present disclosure.

FIG. 8 is a computer architecture diagram illustrating an exemplary computer hardware and software architecture for a computing system capable of implementing aspects of the embodiments presented herein.

DETAILED DESCRIPTION

Figure 1:
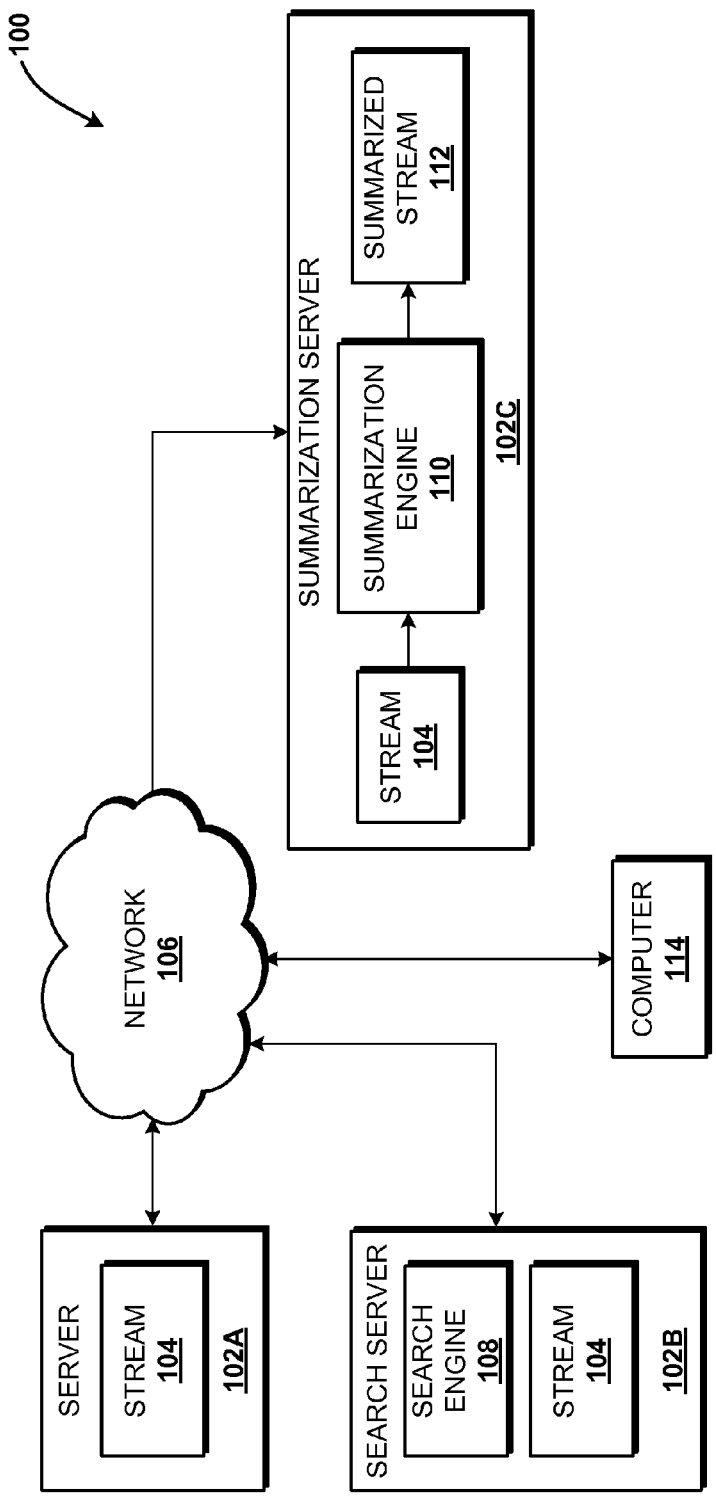
FIG. 1 is a system diagram illustrating an exemplary operating environment for the various embodiments disclosed herein.

The following detailed description is directed to technologies for summarizing streams of information and presenting the summarized streams. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for summarizing streams of information and presenting the summarized streams will be presented.

Referring now to FIG. 1, aspects of one operating environment 100 for the various embodiments presented herein will be described. The operating environment 100 shown in FIG. 1 includes a server 102A that hosts a stream of information 104 ("stream"). The stream 104 can include, but is not limited to, blog postings, updated news events, social network status updates, chat room data, user group updates, RSS feed data, comment threads, comment sections associated with web sites, combinations thereof, and the like. The stream 104 also can include collections of streaming data. In some embodiments, the stream 104 includes all TWEETS relating to a particular topic using the TWITTER real-time messaging service, which may be submitted by or associated with multiple users. In some embodiments, the stream 104 includes all status updates relating to a particular topic or submitted by a particular entity to a social networking service, all news stories relating to a particular topic or entity, as well as other collections of data. Furthermore, the stream 104 can include text, video, photographs, audio, and other data, all of which may be tagged with location data, time data, source data, and/or other metadata. Thus, the stream 104 can include almost any type of data or stream of data, and can include various forms of metadata such as time, location, source, and other data.

The stream 104 is hosted on a server 102A that operates on or in communication with a network 106. The server 102A can be a web server that is accessible via the Internet, can host data such as the stream 104, and can allow users or devices connecting to the server 102A to access the stream 104 and/or to add data to the stream 104. In some embodiments, the server 102A hosts a social networking application, and the stream 104 relates to a social networking "wall" associated with a user. It should be understood that the stream 104 can relate to all social networking "walls" associated with all users of the social networking application that relate to or are submitted by a topic or entity, respectively. The users of the social networking application, and members of the users' social networks are allowed to post comments, links, video, audio, and other content to the social networking walls. The posted data, and metadata describing the time, location, and content of the posted data, can be stored as the stream 104.

In another embodiment, the server 102A hosts a news site, and the stream 104 relates to a comments section associated with the news site. Users of the news site are able to post comments to the comments section. It should be understood that the stream 104 can relate to multiple news sites and/or comments sections. The comments, and data describing the time, location, user information, and the like, can be stored as the stream 104. In still other embodiments, the stream 104 relates to an entire service or network. For example, the stream 104 can be based upon all real-time messages relating to a topic, generated by an entity, relating to an entity, associated with a particular location, generated during a particular time period, or otherwise related, as described herein. In one exemplary embodiment, the stream 104 includes all TWEETS generated using the TWITTER real-time messaging service during a particular time period, and therefore may indicate what all users of the TWITTER service are writing about at a particular time. The above examples are illustrative, and should not be viewed as an exhaustive list of the types of information that may be included in the stream 104.

In some embodiments, the operating environment 100 further includes a search server 102B. The search server 102B can host a search engine 108, which is configured to search the network 106 and/or devices connected thereto, to generate a stream 104. The search engine 108 can obtain information from diverse sources, including the server 102A, as well as other web servers, real time messaging servers, social networking servers, corporate intranets, the Internet, and other servers, databases, devices, and the like. Thus, the stream 104 can include search results relating to a search query, and can be updated at almost any time.

The operating environment 100 further includes a summarization server 102C. The summarization server hosts a summarization engine 110 operating on or in communication with the network 106. The functionality of the summarization engine 110 may be provided by one or more program modules operating on a computer or a server computer. It should be understood that the functionality of the search engine 108 and the summarization engine 110 can be provided by execution of one or more program modules on one or more devices. Thus, it should be understood that the functionality associated with the summarization engine 110 can be provided by the same device that provides the functionality of the search engine 108. Thus, the illustrated embodiment is exemplary and should not construed as being limiting in any way.

The summarization engine 110 is configured to analyze a stream 104 to identify entities associated with the stream 104. As used herein, the word "entity," and variants thereof, is used to refer to one or more subjects, topics, concepts, and/or keywords addressed in the streams 104, people, institutions, companies, and/or groups addressed in the streams 104, events, stories, news items, and/or occurrences addressed in the streams 104, religions, philosophies, cultures, ethnicities addressed in the streams 104, and/or other issues, places, personas, stories, or topics addressed in the streams 104. It should be appreciated that the entities in a stream 104 may include some, none, or all of the items listed above and/or other content not identified above.

The summarization engine 110 is further configured to categorize and organize the data in the streams 104 into one or more clusters based upon the identified entities. As used herein, the word "cluster," and variants thereof, is used to refer to a group of data entries in a stream 104 that are related, at least partially, to the same or a similar entity. A data entry is an atomic unit of data in a stream, for instance, a single blog post, real-time message, status update, comment, and the like. The data in the streams 104 also can be organized into the clusters based upon time, for example, a time, time range, and/or timeframe at or during which the data was generated.

The summarization engine 110 is further configured to summarize the data in the clusters, and output the summarized data as a summarized stream 112. The summarized stream 112 can be stored at a data repository (not illustrated), a server, or another location, or may be transmitted to another device for use or access.

To generate the summarized stream 112, the summarization engine 110 analyzes the data in the clusters, determines a time line for the clusters, and determines how to summarize the data in the clusters. The determination as to how to summarize the data in the clusters may be made based upon software or user preferences, or input from a user or other authorized entity. The generation and display of clusters, the identification of entities, the summarization of the streams 104, and the determination of timelines, will be described in more detail below with reference to FIGS. 2-7.

A computer 114 can be in communication with the network 106 and/or devices operating on or in communication with the network 106 such as the servers 102A-C, the search engine 108, and/or the summarization engine 110. According to various embodiments, the computer 114 is a standard desktop or laptop personal computer system. It should be appreciated, however, that the computer 114 may include other types of computing systems including, but not limited to, server computers, handheld computers, netbook computers, tablet computers, embedded computer systems, video game consoles, personal digital assistants, mobile telephones, smart phones, or other computing devices.

In some embodiments, the computer 114 is configured to access the servers 102A and/or 102B, retrieve a stream 104 therefrom, and generate the summarized stream 112 by execution of one or more program modules at the computer 114 to provide the functionality of the summarization engine 110 described herein. In some embodiments, the computer 114 is configured to access the summarization server 102C, obtain the summarized stream 112 via the network 106, and present the summarized stream 112 to a user. In either or both embodiments, the computer 114 can access the servers 102A and/or 102B to modify the stream 104 or a query that is used to generate the stream 104. The computer 114 can modify the stream 104 by, for example, posting a comment, posting a status update, posting a real-time message, generating an instant message, posting a link, refining a search query, combinations thereof, and the like.

For the sake of clarity, FIG. 1 illustrates one server 102A, one search server 102B, one summarization server 102C, one stream 104, one network 106, and one computer 114. It will be understood, however, that some implementations of the operating environment 100 include multiple servers 102A, 102B, 102C, multiple streams 104, multiple networks 106, and multiple computers 114.

Figure 2:
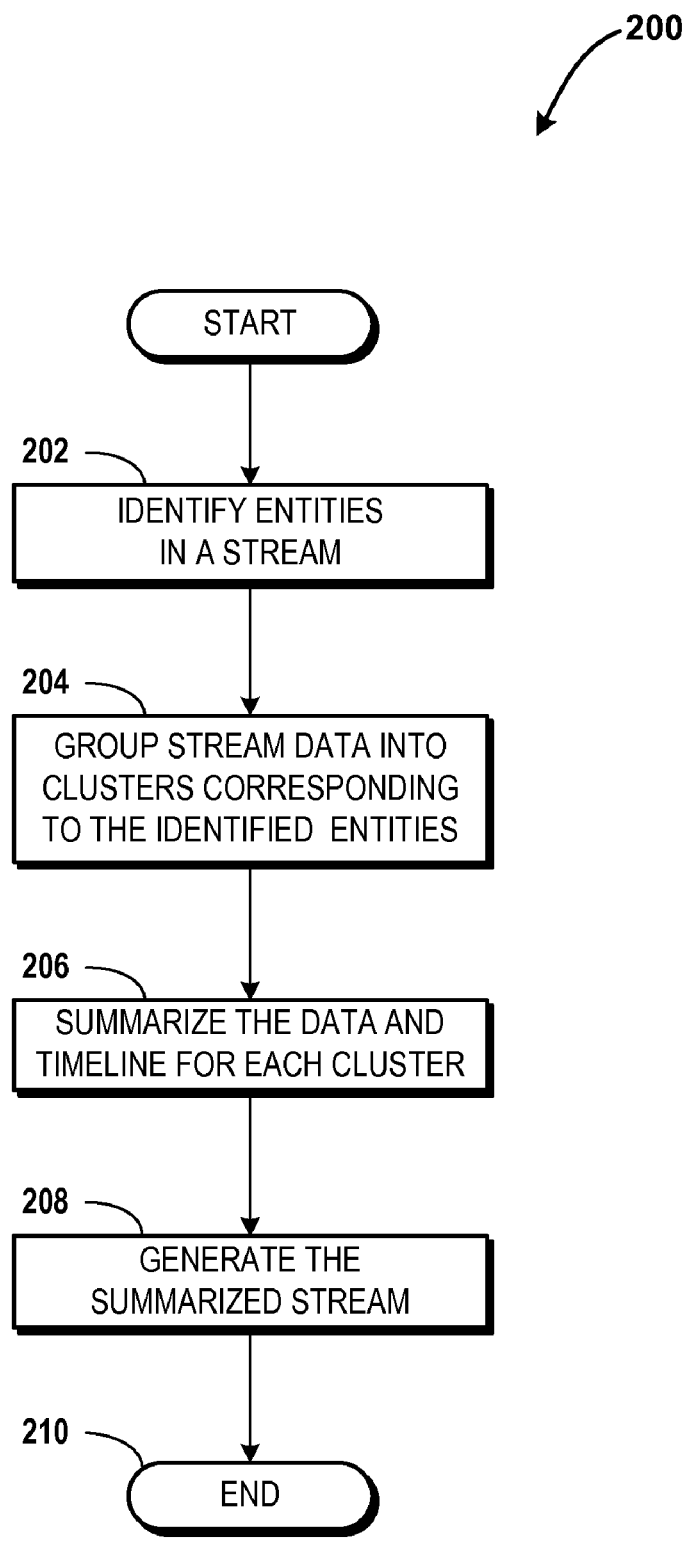
FIG. 2 is a flow diagram showing aspects of a method for summarizing streams, according to an exemplary embodiment of the present disclosure.

Turning now to FIG. 2, a method 200 for summarizing the streams 104 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the summarization engine 110. It should be understood that the summarization engine 110 can be executed by the server 102C, the computer 114, and/or another device configured to execute one or more program modules to provide the functionality described herein. Thus, the described embodiments are merely exemplary and should not be viewed as being limiting in any way.

The method 200 begins at operation 202, wherein the summarization engine 110 analyzes a stream 104 to identify entities in the stream 104. As explained above, the entities can include one or more subjects of the streams 104, and can be identified as topics, keywords, events, stories, people, institutions, companies, universities, opinions, cultures, political parties, philosophies, religions, combinations thereof, and the like. To identify one or more entities in a stream 104, the summarization engine 110 analyzes the stream 104 using one or more technologies such as, for example, natural language processing, disambiguation technologies, keyword identification, repeated occurrence of identified words and/or phrases, and/or other methods of analysis. In some embodiments, the summarization engine 110 recognizes entities that include one or more synonyms. For example, an entity relating to New York City, N.Y. may include references to "New York City," "New York," "NYC," "NY," "The Big Apple," and other references.

The analysis of the stream 104 can include not only recognition of explicit information, but also implicit information within the stream 104. For example, if the stream 104 includes real-time messages or status updates relating to an event, the summarization engine 110 may recognize that the event was interesting based upon implicit information such as the amount, frequency, and/or detail of the real-time messages and/or status updates. If the frequency of such messages and/or updates is low at the beginning of the event, the summarization engine 110 may recognize that the event was of little interest at the beginning If the frequency of the messages and/or updates increases at a particular time, the summarization engine 110 can recognize that the event became more interesting at that time, and can identify an entity corresponding to the event that occurred at the identified time.

Additionally, the summarization engine 110 can search through the stream 104 to identify data in the stream 104 that is repeated, and can identify an entity as corresponding to the data in the stream 104 that is repeated. For example, if the stream 104 includes news items relating to a news story, the summarization engine 110 can analyze the news items to identify repeated terms or phrases. If the word "charity" appears frequently, for example, the summarization engine 110 can identify "charity" as one of the entities of the news story. Similarly, if the stream 104 includes status updates or real-time messages, repeated terms or phrases can be identified as entities, and the data can be grouped according to those entities, as is explained below.

The summarization engine 110 also can search through the stream 104 to identify the point of novelty of a word or phrase, and analyze the number of occurrences of that word or phrase occurring after the point of novelty. For example, if the stream 104 relates to a political campaign, the summarization engine 110 may identify defining moments in the campaign such as the revelation of a new idea or a scandal. The summarization engine 110 may recognize that the word or phrase is repeated after the point of novelty, and may identify an entity beginning at the point of novelty and continuing with all of the data in the stream 104 that references the word or phrase. All of the above examples are merely illustrative of the concepts presented herein, and should not be construed as being limiting in any way.

From operation 202, the method 200 proceeds to operation 204, wherein the summarization engine 110 groups data from the stream 104 into clusters corresponding to the identified entities. As explained above, a cluster can include any data in the stream 104 that mentions or relates to an entity. Because the data in the stream 104 can include news stories, articles, comments, status updates, real-time messages, and the like, it should be appreciated that some status updates, news stories, articles, and the like, may relate to more than one entity. As such, data in the stream 104 can occur in more than one cluster.

From operation 204, the method 200 proceeds to operation 206, wherein the summarization engine 110 summarizes the data in the clusters and determines and summarizes the timelines of the clusters. As explained above, the clusters include data in the stream 104 that are related to the same entity. Thus, the operation 206 includes analyzing the data in the cluster to generate a summary of the cluster, and to define a timeline corresponding to the summarized cluster data.

The summarization engine 110 can analyze the data in the clusters using natural language processing or word or phrase recognition to summarize the data in the clusters. In summarizing the clusters, the summarization engine 110 can be configured to ignore language that is unrelated to the entities. For example, if data in the clusters is directed to comments on a web site, the summarization engine 110 can be configured to ignore comments wherein commentators engage in conversation with one another, or discuss topics not related to the web site for which the comments section is included.

The summarization engine 110 can generate a summary of the data in the clusters based upon aggregation. Aggregation is counting a number of references to one or more entities referenced in the cluster. Thus, the summary of a particular cluster may indicate that a word or phrase is mentioned a certain number of times in the cluster. The number of references to a particular word or phrase may be used to provide an overview of the cluster. Additionally, the summary engine 110 can generate the summary of the data in the clusters by analyzing the data to determine the most interesting data in the cluster. The most interesting data in the cluster may be determined by searching the cluster for references to that data, reproductions or other responses of that data, and the like. In other words, the data itself may become a topic that is addressed by other data in the cluster, thereby indicating that the data is interesting or important.

The summarization engine 110 can be configured to summarize sentiment relating to the stream 104 as well. Sentiment relating to a particular topic can change drastically over time, while established facts relating to a topic tend to change less drastically. Thus, the summarization engine 110 can be configured to summarize the most recent sentiment, and to ignore or reduce the importance of older sentiment. In some embodiments, the summarization engine 110 summarizes sentiment in a cluster or over several clusters, and presents a summarized view of sentiment, thereby allowing a user to understand trends relating to sentiment, if desired.

The summarization engine 110 also can summarize location information associated with a cluster, e.g., locations associated with comments or other data included in the cluster. The summarization engine 110 also can summarize sources of the data in the stream 104. The sources of the data in the stream 104 can be summarized depending upon whether the sources are celebrities, people with large social networks, politicians, and the like. Thus, the operation 204, or the methods disclosed herein, can include accessing the search engine 108 or another source of information, and obtaining data relating to the sources associated with data in the stream 104.

In one embodiment, the summarization engine 110 obtains data relating to social networks of users associated with data in the stream 104. Statistics relating to the social networks, e.g., the number of connections or followers in the network, the number of posts, and the like, are obtained and transmitted to the summarization engine 110 to analyze when summarizing the stream 104. The social networking information can include status updates, real-time messages, and the like, and may be included as part of the stream 104 that is summarized by the summarization engine 110. Thus, the social networking information can be used to supplement the summary of the stream 104 by reflecting interest in a topic, sentiment relating to a topic, and the like.

The clusters can also be summarized to develop a coherent representation of what is occurring in the stream 104. For example, a user may use a real-time messaging service such as the TWITTER real-time messaging service to provide commentary relating to an event as it unfolds. Over the course of the event, the user may post or "TWEET" a large number of messages relating to the event, any one of which may provide little or no context or information by itself. When all of the messages are summarized, however, a story may be developed. Thus, the summarization engine 110 is configured to stitch together multiple updates or messages from the same or different person to tell a coherent story or uncover a fact that may not exist in any isolated update.

The operation 204 also can include determining timeline data for each of the clusters based upon the data in each of the clusters. The summarization engine 110 may not only determine the length of the timeline, but also whether the data is spread out evenly over the total time, or if the density of the data in the clusters changes over the total time. This information may be used to present the data, as is explained herein.

From operation 206, the method 200 proceeds to operation 208, wherein the summarization engine 110 formats and generates the summarized stream 112. The summarized stream 112 can include a summary of the stream 104, e.g., the topics covered, the number of messages relating to each of the topics that exist in the stream 104, timeline information, an average age or demographic information associated with sources of the data in the stream 104, and the like. The summarized stream 112 also can include an indication of the clusters in the stream 104, and the times associated with the clusters, if desired. The summary and the summarized stream 112 can be presented to a user, as will be illustrated and described in more detail with reference to FIGS. 3-7. The method 200 ends at operation 210.

In some embodiments presented herein, a user has the ability to summarize social networks of other users. As such, data of a social network over time may be the stream 104, as mentioned above. By summarizing a social network, a user may be able to determine what the summarized social network discusses over time, activity of the social network over time, and determine how the social network may be interesting to the user.

Figure 3:
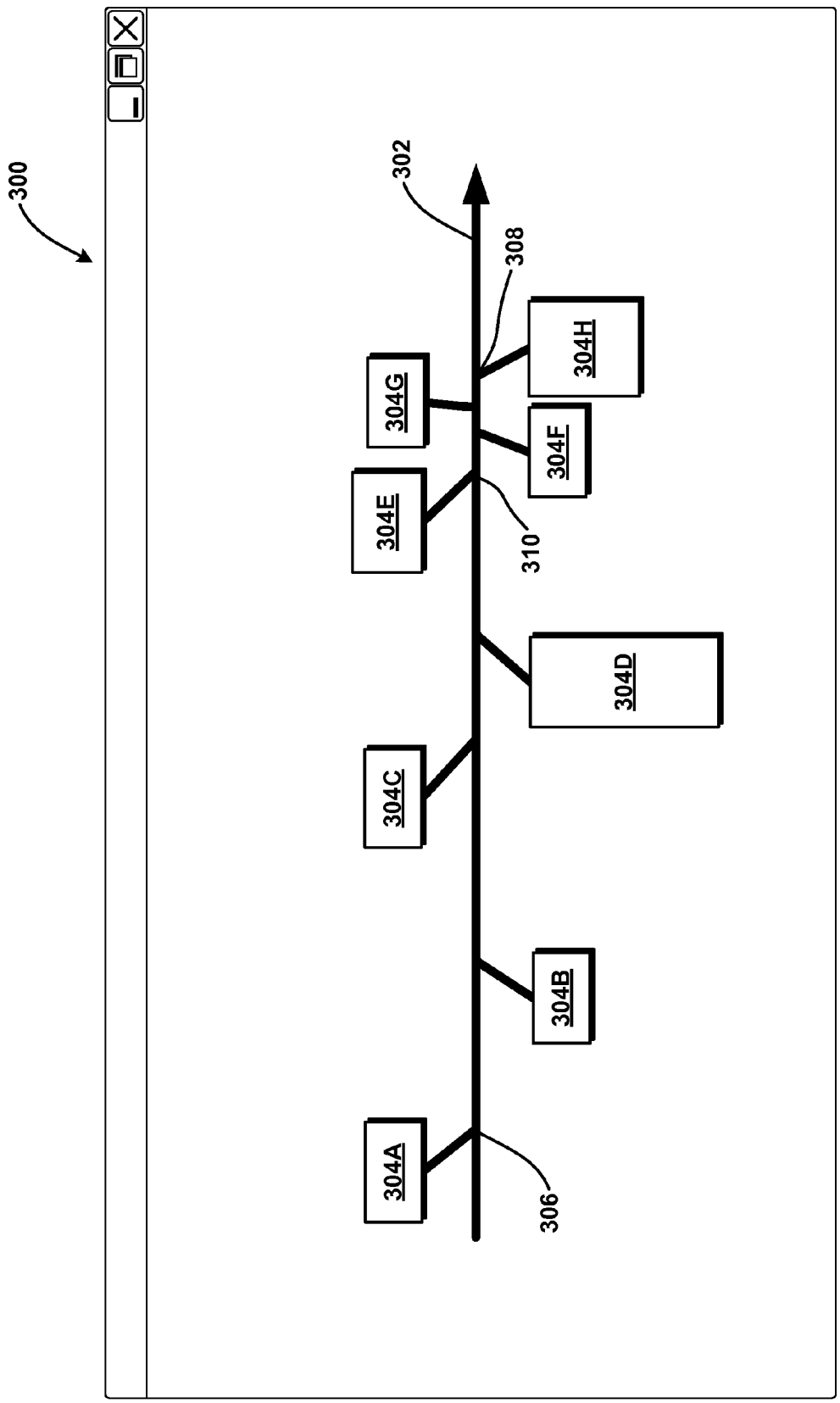
FIG. 3 is a user interface diagram illustrating a screen display presenting a summarized stream, according to an exemplary embodiment of the present disclosure.

Turning now to FIG. 3, a user interface diagram illustrating a screen display 300 presenting a summarized stream 112 is shown, according to an exemplary embodiment of the present disclosure. The screen display 300 can be displayed to a user, for example, on a display associated with the computer 114. The illustrated screen display 300 includes a timeline 302, the format of which can be determined by the summarization engine 110 by analyzing the data of a stream 104 and/or user input, as is described herein. The screen display 300 further includes a number of clusters 304A-H, hereinafter collectively referred to as the clusters 304.

The clusters 304 can include text, photos, video, links to content, comments, and the like, as will be illustrated and described below with reference to FIGS. 4A-4B. The clusters 304 can be based upon entities determined by the summarization engine 110, and may be displayed with associated times or timeframes to graphically reflect changes in a story, event, news item, sentiment, political contest, or other issue over time. Thus, the number of clusters 304 generated, the density of the clusters on the timeline 302, the contents of the clusters 304, and the size and configuration of the clusters 304 may be varied by the summarization engine 110 depending upon preferences, user input, the contents of the stream 104, and/or other considerations.

In the illustrated embodiment, the cluster 304A is associated with a first time 306, which may correspond to the first time reports of a news event, story, or other item of interest, are noted. The first time 306 also can correspond to the point of novelty described above with reference to FIG. 2. As is described herein, the time scale used to display the clusters 304 can be linear, wherein each portion of the timeline 302 can relate to a defined time unit. Alternatively, the timeline 302 can be irregular. In this manner, a portion of the timeline 302 may correspond to one time unit at one location of the timeline 302, and may relate to a different time unit at another location of the timeline 302. Thus, portions of the timeline 302 can be compressed or lengthened to allow display of more or fewer clusters 304, or to alter the density of the clusters 304 on the timeline 302.

The cluster 304H, the last cluster displayed on the timeline 302, is associated with a time 308. Additionally, another cluster 304E is associated with a time 310. The time 306 associated with the cluster 304A may have occurred hours, days, weeks, months, or even years before the next cluster 304B on the timeline 302. Similarly, the time 310 associated with the cluster 304E may have occurred only minutes before the time 308 associated with the cluster 304H, as will be described herein. Thus, it should be appreciated that the timeline 302 may include an irregular representation of time, and that the clusters 304 may be arranged and displayed in varying densities, as explained above.

FIG. 4A illustrates a detailed view of the cluster 304A, according to an exemplary embodiment of the present disclosure. The detailed view of the cluster 304A may be included in the screen display 300 described above, or may be accessed by entering a command to view a detailed view of the cluster 304A. It should be appreciated that the details of the clusters 304 are not illustrated in FIG. 3, but may be included if desired.

For purposes of illustration, and not limitation, the illustrated embodiment assumes a stream 104 directed to coverage of a technical conference. It should be understood that the stream 104 can include information associated with multiple users and websites, as explained above. Thus, the stream 104 can include all news stories, status updates, TWEETS or other real-time messages, comments, blog postings, and the like, that relate to the technical conference. This embodiment is exemplary and is provided to illustrate concepts disclosed herein, not to limit the disclosure in any way.

In the illustrated embodiment, the summarization engine 110 has identified the scheduling of the conference as one of the entities that is addressed in the stream 104, and the first entity, with respect to time, addressed in the stream 104. As explained above, the summarization engine 110 may identify this entity by analyzing the stream 104, and recognizing that the scheduling of the conference is referenced by data in the stream 104. The summarization engine 110 defines the cluster 304A as being directed to the scheduling of the conference, and includes the data in the stream 104 relating thereto. As illustrated in FIG. 4A, the summarization engine 110 can generate a title 400A for the cluster 304A corresponding to the identified entity, and can display the title 400A in the cluster 304A, if desired.

The summarization engine 110 also analyzes the data in the cluster 304A to determine a timeframe associated with the cluster 304A, as explained above with reference to FIG. 2. If desired, the title 400A can include an indication of the determined timeframe associated with the cluster 304A.

The data from the stream 104 relating to the scheduling of the conference is presented as two entries 402A-B, both of which are directed to the scheduling of the conference. In the illustrated embodiment, the timeframe associated with the cluster 304A covers two months, as the entries 402A-B were posted in different months, but were directed to the same entity. This embodiment is exemplary and should not be construed as being limiting in any way.

It should be appreciated that both of the entries 402A, 402B illustrated in FIG. 4A mention "technical conference," that the conference has been "scheduled," and the date of the conference, i.e., "April, 2009." These words and phrases were identified by the summarization engine 110 as the one or more entities associated with this cluster 304A. In the illustrated embodiment, the entity for the cluster 304A, as identified by the summarization engine 110, is "technical conference scheduled for April, 2009," though this entity is exemplary.

Additionally, it should be understood that the content of the clusters 304 can be varied depending upon various parameters. The clusters 304 can include content rated by interest or relevance, as illustrated in FIGS. 4A-4B, or can include general summaries and/or statistics relating to the stream 104, as described herein. With respect to general summaries and/or statistics relating to the streams 104, the clusters 304 can show, for example, a number of comments regarding a particular event, or a number of social network connections commenting on a particular event, without showing the actual comments. Similarly, the number of connections at a concert, the number of subtopics regarding a topic, and the like, can be summarized and provided in the clusters 304. These examples are merely illustrative, and should not be construed as being limiting in any way.

Some of the contemplated parameters used to determine what data to display in the clusters 304 include, but are not limited to, recency of the data, interestingness, how many threads are related to the data, combinations thereof, and the like. With respect to interestingness, the summarization engine 110 can determine the perceived interestingness of a particular data entry, e.g., a comment, by determining how many times the comment is referenced in other comments, how many other comments reiterate the same or similar information, how many other comments post the same video, audio, picture, or other content, and the like. Such activities can indicate that other users found the comment interesting and/or authoritative, and can therefore increase the perceived interestingness and/or authority of the comment.

It should be understood that additional data from the stream 104 may relate to the cluster 304A. In some embodiments, the cluster 304A can include a link to additional data in the cluster 304A, and/or can include user interface ("UI") controls for scrolling through the cluster 304A. Additionally, or alternatively, the cluster 304A can operate as a UI control, the selection of which retrieves additional data relating to the cluster 304A.

If an indication that additional data relating to a cluster 304 is received by the summarization engine 110 and/or the computer 114, the summarization engine can provide the additional data. For example, the summarization engine 110 can provide data from the stream 104 that was not presented in the cluster 304, but existed when the cluster 304 was generated.

The summarization engine 110 also can update the summarized stream 112 according to time and/or selection of a filter. To update the summarized stream 112, the summarization engine 110 can determine the time at which the summarized stream 112 was generated, an indication that may be determined by examining the summarized stream 112 and/or time data associated with the summarized stream 112. Alternatively, the summarization engine 110 can access an updated version of the stream 104, and compare the data in the updated version of the stream 104 to data in the summarized stream 112.

If updated data corresponding to the summarized stream 112 is available, the summarization engine 110 can retrieve the updated data, for example data that was created after the time data associated with the summarized stream 112. The summarization engine 110 also can group the data into the identified clusters, recognize new entities and populate new clusters, if needed, and present the updated summarized stream 112 to the requesting device and/or user. Thus, the summarization engine 110 can provide an updated version of the summarized stream 112 based upon a particular time.

In some embodiments, as mentioned above, filters relating to various aspects of the summarized stream 112 can be generated and applied to the data presented, e.g., the data in the clusters 304. The filters can be based upon various aspects of the summarized stream 112 including, but not limited to, time, location, social networking information, authority of sources of the data, sentiment and/or point of view associated with the data, and the like. The summarization engine 110 can implement a selected filter by removing data, or by accessing one or more devices operating on or in communication with the network 106 to obtain additional information to include in the summarized stream.

The applied filters may be used to modify the data presented to a user. For example, a user can select an option to filter the data in the clusters to display only data created in a particular time period, e.g., a week ending at the current time, thereby restricting the view to more recent information. In response to this selection, the summarization engine 110 can remove data from the clusters 304 that was created more than one week ago. Similarly, a user may select an option to restrict the presented data to data submitted by a member of the user's social network. In response to this selection, the summarization engine 110 can retrieve data relating to the user's social network, and restrict the presented data to data submitted by a member of the user's social network. It should be understood that more than one filter may be applied at a time to provide a multidimensional filter. For example, users may apply multiple filters to clusters and/or data restructured by time and location, time and fact/sentiment indications, social network information and location information, and the like. These examples are merely illustrative, and should not be construed as being limiting in any way. The use of filters to modify the data presented, and/or to update the clusters 304, is described in more detail below with reference to FIGS. 5A-5D.

FIG. 4B illustrates a detailed view of the cluster 304H, according to an exemplary embodiment of the present disclosure. The summarization engine 110 has identified conference updates for day four of the conference as one of the entities that is addressed by the stream 104, and defined the cluster 304H as being directed to the updates for day four of the conference, as indicated in the title 400B of the cluster 304H.

The illustrated title 400B also includes an indication of the timeframe associated with the cluster 304H. The data from the stream 104 relating to updates for day four of the conference are presented as four entries 402C-F. It should be understood that the illustrated entries 402C-F are exemplary, and that more entries 402 can be displayed in the cluster 304H, or can be accessed via a link in the cluster 304H or through selection of a UI control such as, for example, the cluster 304H illustrated in FIG. 4B. The timeframe associated with the cluster 304H covers one calendar day, and all of the entries 406C-F were posted on the same calendar day. This embodiment is exemplary and should not be construed as being limiting in any way.

It should be appreciated that all of the entries 406C-F illustrated in FIG. 4B mention "technical conference," are directed to providing updates regarding the technical conference, and were made on the same date, i.e., Apr. 23, 2009, which corresponds to the fourth day of the conference. It should also be appreciated that none of the illustrated entries references a "fourth day" of the conference, or otherwise provide an explicit indication that Apr. 23, 2009 corresponds to the fourth day of the referenced conference.

As such, in identifying the entity for this cluster 304H, the summarization engine 110 accessed implicit data to infer that Apr. 23, 2009 corresponds to the fourth day of the conference. In the illustrated embodiment, the summarization engine 110 analyzed the data corresponding to the clusters 304A and 304H to make this determination. For example, the data represented by the entry 402B includes an indication that the technical conference was scheduled for Apr. 20, 2009 through Apr. 24, 2009, i.e., five days. Thus, the summarization engine 110 uses that explicit data to infer that Apr. 23, 2009 corresponds to the fourth day of the conference. In the illustrated embodiment, the entity for the cluster 304A, as identified by the summarization engine 110, is "technical conference comments from day four," though this entity is exemplary.

Figure 5A:
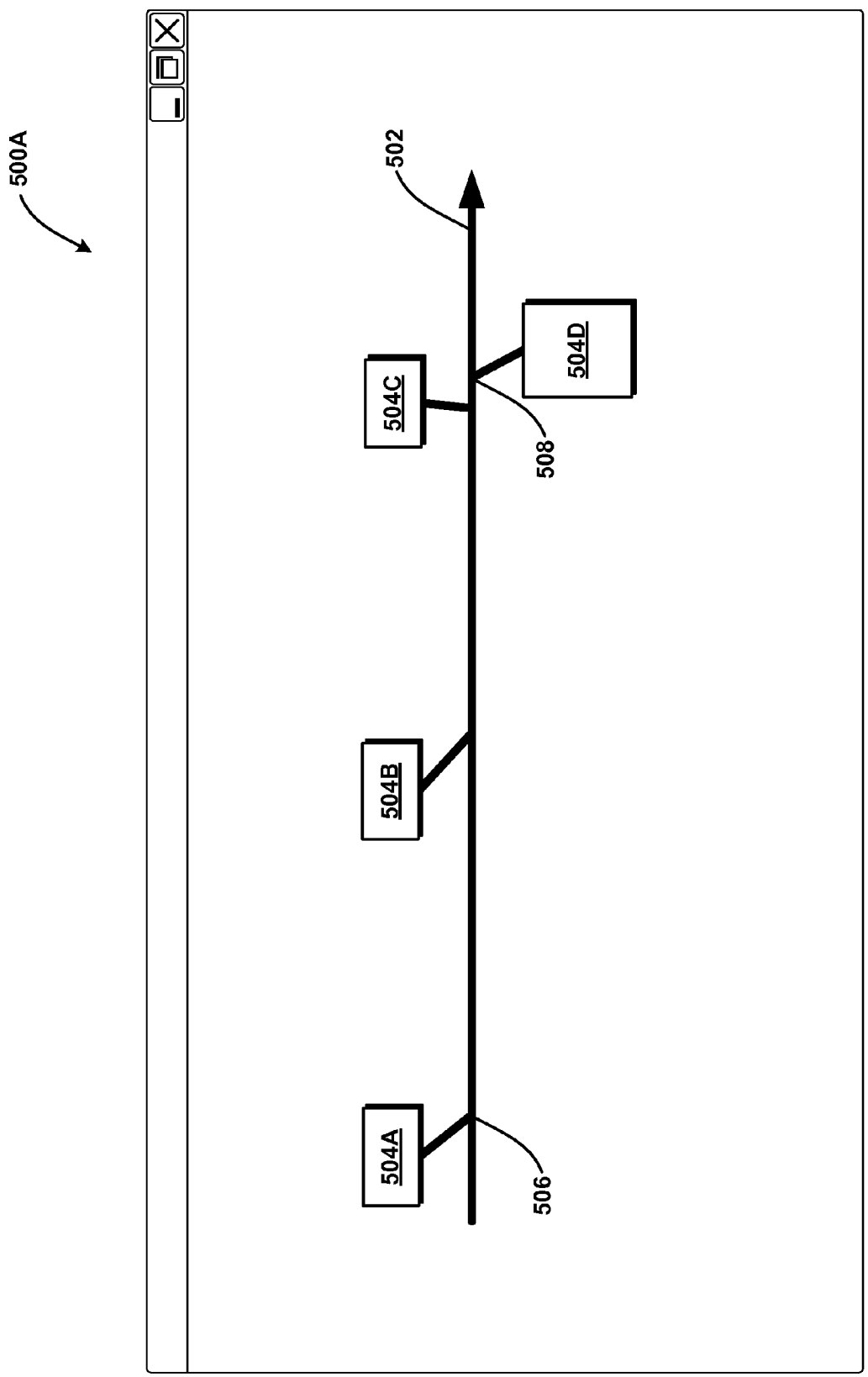
FIGS. 5A-5D are user interface diagrams illustrating screen displays presenting a summarized stream, according to exemplary embodiments of the present disclosure.

Turning now to FIGS. 5A-5D, additional aspects of the present disclosure will be described. In FIG. 5A, another user interface diagram illustrating a screen display 500A presenting a summarized stream 112 is shown, according to an exemplary embodiment of the present disclosure. The illustrated screen display 500A includes a timeline 502 and the clusters 504A-D, hereinafter collectively referred to as the clusters 504. The screen displays 300, 500A, and 500B correspond to a timeline presentation of the summarized stream 104. Other presentation formats are described below with reference to FIGS. 5C-5D.

The screen display 500A illustrates a modification of the presented data in response to application of a filter. The screen display 500A can correspond to the screen display 300, but may include some or all of the data described above with reference to FIGS. 3-4B. Similarly, the screen display 500A can include more, less, or the same amount of data described with reference to the clusters 304 illustrated in FIG. 3.

In particular, the screen display 500A can represent the summarized stream 112, after application of a filter. Thus, the data in the screen display 500A may be limited to data in the stream 104 that is associated with users or sources within a particular geographic location, institution, company, or other metadata associated with the data in the stream 104. In the illustrated embodiment, the summarization engine 110 has applied a filter to limit or restrict the data in the clusters 504 to data from users who are locally located, i.e., within a specified distance of the user who selected the filter. Thus, the screen display 500A can include a summarization of the stream 104 from a local point of view.

With additional reference to FIG. 3, it will be appreciated that the respective locations of the clusters 504A, 504B, 504C, and 504D correspond to the respective locations of the clusters 304A, 304C, 304G, and 304H. Thus, each of the clusters 304A, 304C, 304G, and 304H include comments or other input associated with users from the particular geographic location used to filter the data from the stream 104 to provide the clusters 504. The clusters 304B and 304D-F do not include any comments from users in the specified location. Therefore, the data associated with the clusters 304B and 304D-F is not displayed in FIG. 5A.

It will therefore be appreciated that the time 506 associated with the cluster 504A can be the same time indicated by the time 306 associated with the cluster 304A. Similarly, the time 508 associated with the cluster 504D can be the same time indicated by the time 308 associated with the cluster 304H.

Figure 5B:
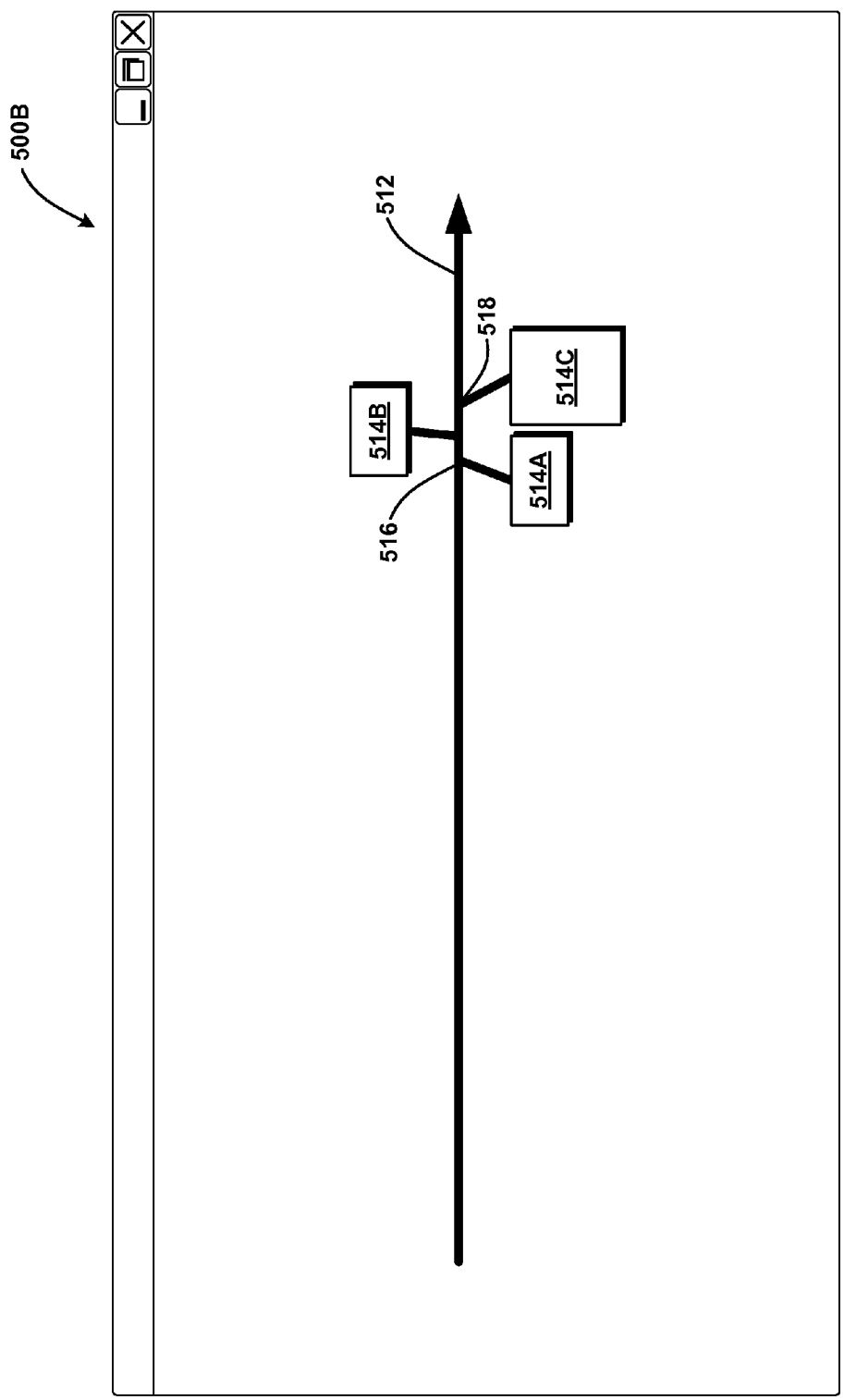

In FIG. 5B, another user interface diagram illustrating a screen display 500B presenting a summarized stream 112 is shown, according to another exemplary embodiment of the present disclosure. The illustrated screen display 500B includes a timeline 512 and the clusters 514A-D, hereinafter collectively referred to as the clusters 514.

The screen display 500B can represent the summarized stream 112, after application of another filter. In the illustrated embodiment, the summarization engine 110 has applied a filter to limit or restrict the data in the clusters 514 to data in the stream 104 that is associated with users or sources within a particular social network, user group, or other electronic community. It should be appreciated that a user of the summarization engine 110 may use this feature to limit or filter the data in the clusters 514 to data from members of the user's social network. Thus, the screen display 500B can include a summarization of the stream 104 from a point of view associated with a user's social network.

Again referring additionally to FIG. 3, it will be appreciated that the respective locations of the clusters 514A, 514B, and 514C correspond to the respective locations of the clusters 304F, 304G, and 304H. Thus, each of the clusters 304F, 304G, and 304H include comments or other input associated with users from the within the specified social network, user group, or other community, an aspect used to filter the data from the stream 104 to provide the clusters 514. The clusters 514, however, may not include all of the comments or other input that is included in the clusters 304, since comments from those who are not members of the user's social network, group, or other community may be filtered out of the clusters 514. Additionally, it should be appreciated that the clusters 304A-E do not include any comments from users in the specified electronic community. Therefore, the data associated with the clusters 304A-E is not displayed in FIG. 5B.

Because no one in the specified network, group, or other community commented or generated other input until the time 516 associated with the cluster 514A, no clusters 514 are illustrated before that time. It should be appreciated that the time 518 associated with the cluster 514C can be the same time indicated by the time 508 associated with the cluster 504D. Although FIG. 5B describes filtering a view based upon a user's social network, it is contemplated that a user may filter a view based on another's social network. For example, a user may wish to view the summarized stream 112 filtered by a celebrity's social network, thereby possibly understand how the celebrity's friends feel about the topic of the stream 104 or a cluster related thereto.

Figure 5C:
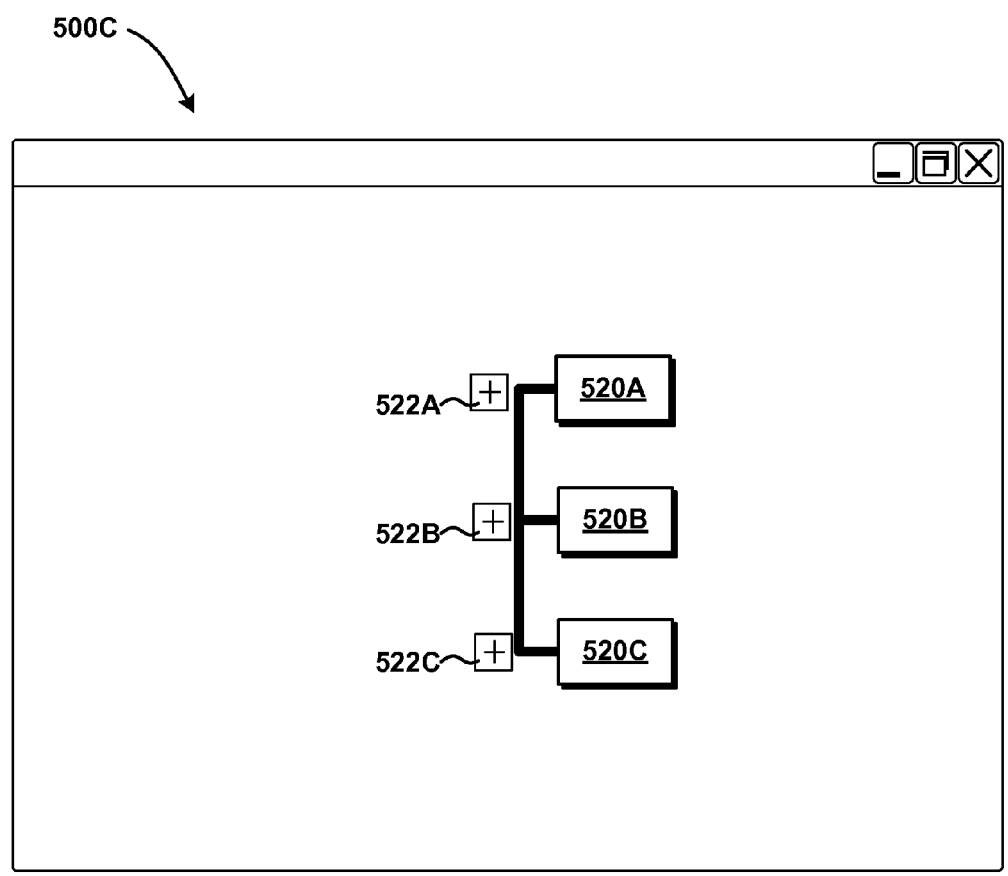

Another presentation method for presenting the summarized stream 112 is illustrated and described with reference to FIG. 5C-5D. Referring to FIG. 5C, another screen display 500C is illustrated, according to an exemplary embodiment of the present disclosure. FIG. 5C illustrates three clusters 520A-C, hereinafter referred to as the clusters 520. UI controls 522A-C, hereinafter referred to as the UI controls 522, are provided to access additional and/or related data relating to the clusters 520. It should be understood that the UI controls 522 may be presented only with clusters 520 for which additional and/or related data exists. The additional and/or related data can include data in the same clusters 520, or data in clusters that are related to the clusters 520. Selection of the UI control 522B can expand the presented view to display the additional and/or related data, as illustrated in FIG. 5D.

Figure 5D:
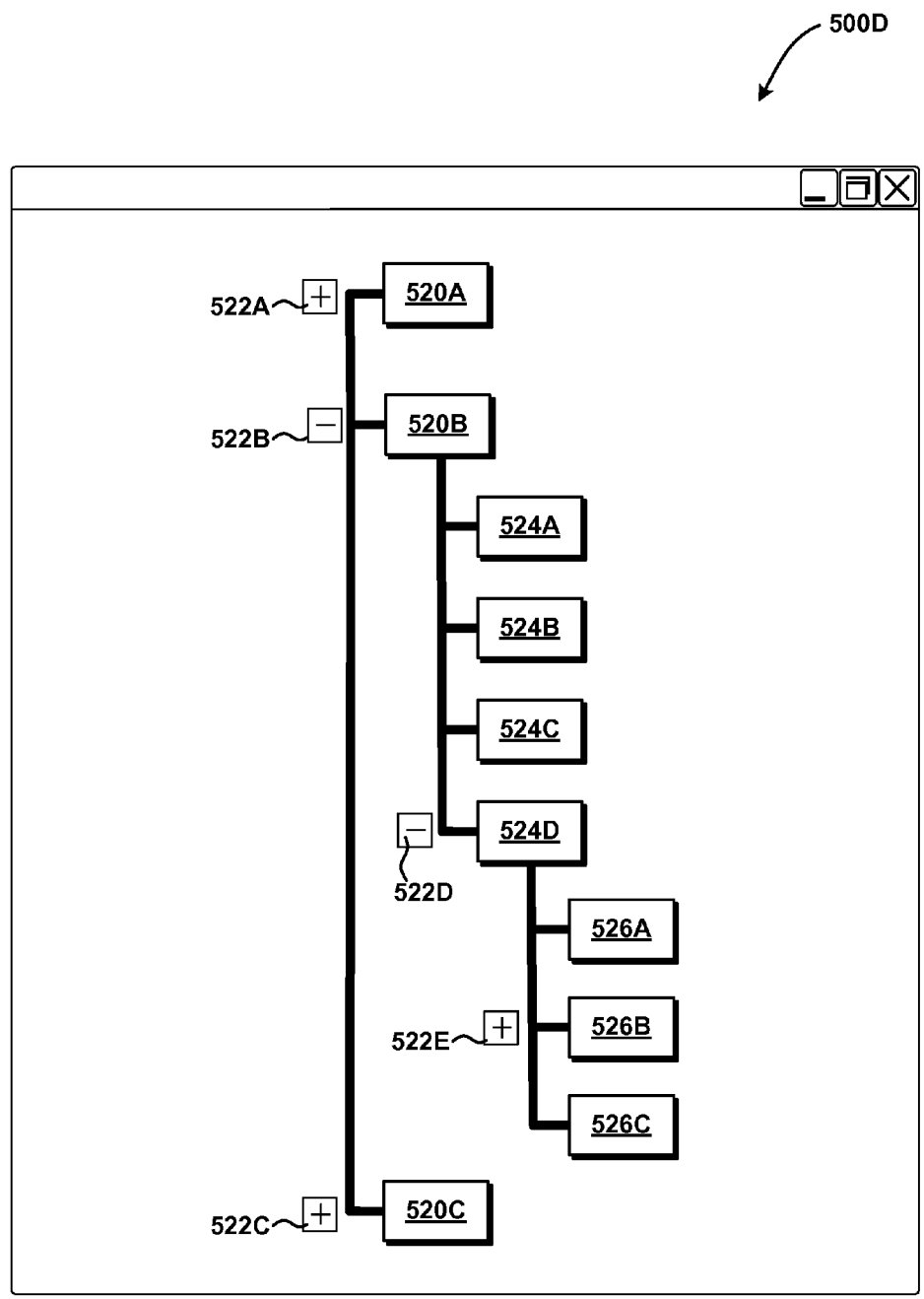

FIG. 5D illustrates another screen display 500D, according to an exemplary embodiment of the present disclosure. FIG. 5D illustrates the clusters 520, and additional and/or related data, presented as the clusters 524A-D, hereinafter referred to as the clusters 524. The summarization engine 110 can present the clusters 524 in response to selection of the UI control 522B described above. Additionally, the clusters 526A-C, hereinafter referred to as the clusters 526, have been displayed in response to selection of a UI control 522D. The clusters 526 can include additional or related data relating to the cluster 524D. A UI control 522E is provided to access additional or related data relating to the cluster 524B, but has not been selected.

The screen displays 500C-D can be used by a user to explore data relating to entities and related entities, e.g., topics and sub-topics, by graphically navigating a presented summarized stream 112. Thus, a user may initially be presented with clusters 520 relating to three aspect of an automobile, e.g., safety features, performance, and reliability. Upon selecting the UI control 522B, which in the illustrated embodiment corresponds to performance of the automobile, additional clusters 524 can be presented to the user. In the exemplary embodiment, the clusters 524 relate to, respectively, braking performance of the automobile, steering performance of the automobile, transmission performance of the automobile, and engine performance of the automobile.

Upon selecting the UI control 522D, which corresponds to the engine performance of the automobile, additional clusters 526 can be presented to the user. The additional clusters 526 relate to, respectively, engine horsepower, engine output, and engine efficiency. A UI control 522E corresponding to the cluster 526B may be provided to access additional clusters relating to the engine output. This example is merely illustrative, and should not be construed as being limiting in any way.

The summarization engine 110 can be configured to analyze the clusters 520, 524, 526 to identify data perceived as being the most interesting data and/or to identify the most relevant data relating to user input, e.g., a search query. As discussed above, the perceived interestingness of the clusters 520, 524, 526 can be determined by evaluating signals such as links targeting data in the clusters, comments relating to data in the clusters, and the like. The summarization engine 110 also can analyze time data associated with the clusters 520, 524, 526 and identify the most recent data relating to the user input.

The summarization engine 110 can automatically expand or collapse different parts of the displayed data depending upon perceived relevance, level of interest to the user, timeliness, i.e., how recent the data is, and the like. Thus, the initial view of the clusters 520, 524, 526 may be partially expanded, as shown in FIG. 5D, or may be partially or completely collapsed, as shown in FIG. 5C. The determination as to how to configure the displayed data, and/or what to show or collapse, may be based upon preferences and/or an analysis of the data in the summarized stream 112.

Additional presentation methods are contemplated. For example, the data in the summarized stream 112 can be presented in a heat map, or other frequency-indicating graphic. Contributions by particular authors or sources, data corresponding to a particular topic or entity, and/or the frequency or weight of certain terms or phrases may be measured and represented by different colors within a graphic to indicate activity within the stream 104 and/or a cluster of a summarized stream 112 that relates to various authors, topics, words, phrases, and the like. Additionally, histograms or other representations can be generated to illustrate or explain changes in sentiment over time, how a topic has grown over time, activity in the cluster or topic over time, whether the cluster or topic has attracted attention from a geographically widening or narrowing area over time, combinations thereof, and the like. Other methods are contemplated, but are not discussed herein in detail for the sake of brevity.

In some embodiments, users can control timelines of displayed summarized streams 112 and zoom into or out the timeline to view more or less of the timeline. For example, a user can zoom into a timeline to view more detail for a particular timeframe, in response to which additional data can be displayed and/or the existing data can be spread out, if desired. Similarly, a user may wish to see how activity regarding the stream 104 has changed with respect to time. As such, a user may zoom out to view the life of the stream 104, and to see activity regarding the stream 104 over time. These examples are merely illustrative of the ability to zoom into and out of the time line, and should not be construed as being limiting in any way.

Figure 6:
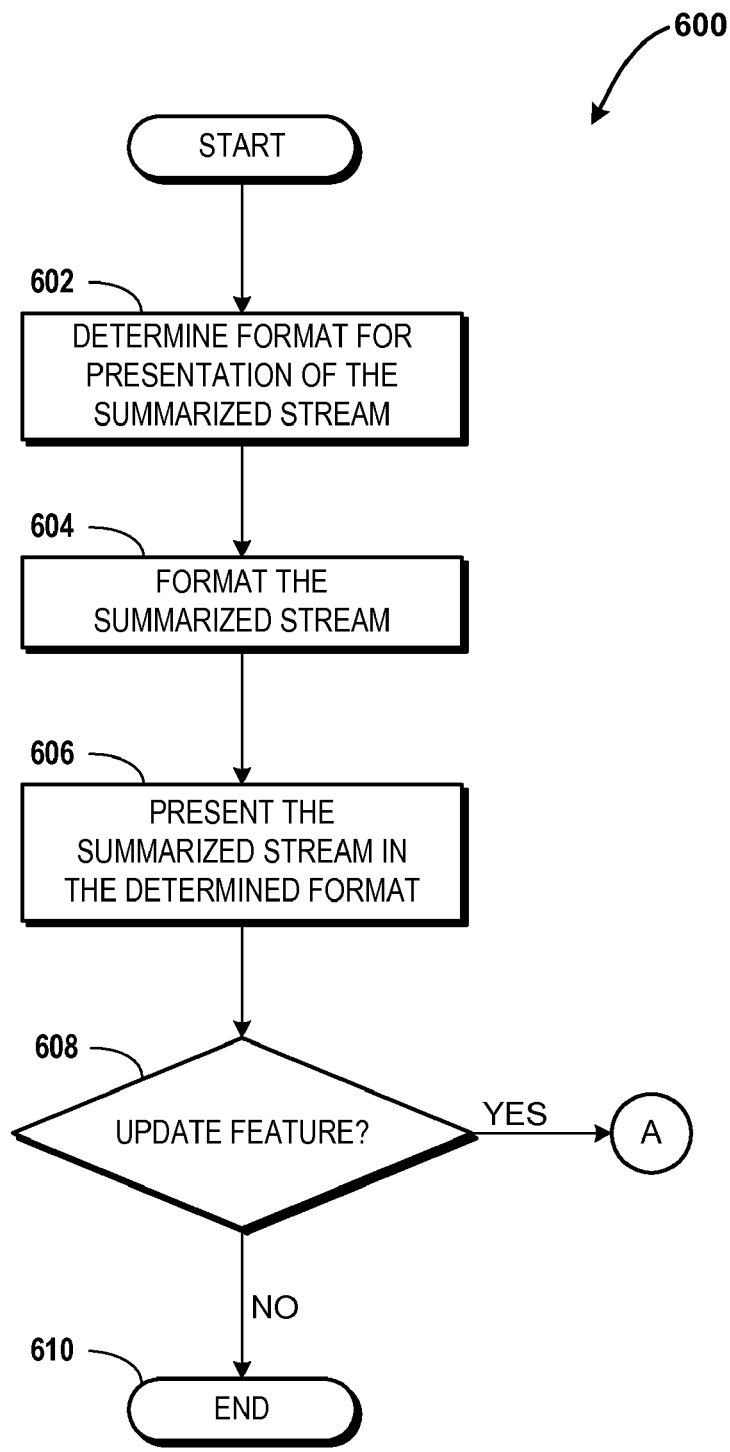
FIG. 6 is a flow diagram showing aspects of a method for presenting summarized streams, according to an exemplary embodiment of the present disclosure.

Turning now to FIG. 6, a method 600 for summarizing and presenting the streams 104 will be described in detail. The method 600 begins at operation 602, wherein the summarization engine 110 determines a format in which to present the summarized stream 112. The summarization engine 110 can make this determination based upon the data in the summarized stream 112, a user preference, user input, or the like, as explained above. Additionally, the summarization engine 110 can determine the format to use for the data in the summarized stream 112 based upon an analysis of time data associated with the summarized stream 112. If long amounts of time pass between data associated with the various clusters, the summarization engine 110 may determine to present a collapsible/expandable view, i.e., a tree diagram, as illustrated and described above with reference to FIGS. 5C-5D. Additionally, if the data in the summarized stream 112 includes data that is expected to change slowly over time, e.g., facts relating to geography, science, and the like, the collapsible/expandable view described above may be selected by the summarization engine.

If the data in the summarized stream 112 is relating to an evolving story, e.g., current events such as political campaigns, news stories, sports events, and the like, a presentation such as that illustrated and described above with reference to FIGS. 3 and 5A-5B may be selected to provide an almost immediate appreciation of how a story has evolved with respect to time. Other methods of presenting the data in the summarized stream 112 are contemplated, but are not illustrated herein for the sake of brevity. Other exemplary embodiments include histograms, web diagrams, radial charts, and the like.

From operation 602, the method 600 proceeds to operation 604, wherein the summarization engine 110 formats the summarized stream 112 for presentation in the determined format. The summarization engine 110 can determine how to present the summarized stream 112 by determining a time scale to use for the presented display, and formatting the clusters accordingly. The summarization engine 110 also can analyze the summarized stream 112 to determine how the various clusters are related, and how to present that data to the user, e.g., which cluster to link to another cluster, whether to collapse some aspect of the presented diagram to decrease the emphasis thereon, or the like.

From operation 604, the method 600 proceeds to operation 606, wherein the summarization engine 110 presents the data from the summarized stream 112 in the determined format. The operation 604 can include transmitting or allowing access to the data from the summarized stream 112. If the method 600 is provided by the computer 114, the operation 604 can include output on a video channel of the computer 114, or other presentation. If the method 600 is provided by a remote server or computer, the operation 604 can include hosting the data from the summarized stream 112 to allow a remote system or user to access the data.

From operation 606, the method 600 proceeds to operation 608, wherein the summarization engine 110 determines if an update feature is selected or is available. As described above, the update feature may be used to update the summarized stream 112 from a particular time at which the summarized stream 112 is generated, to add additional or alternative data to the summarized stream 112 based upon application of a filter, or to access data in response to a request for additional data, as will be explained below with respect to FIG. 7. If an update feature is not available, or is not enabled or selected, the method 600 ends at operation 610. If the update feature is available, enabled, and/or selected, the summarization engine 110 can provide the functionality described below with reference to FIG. 7.

Figure 7:
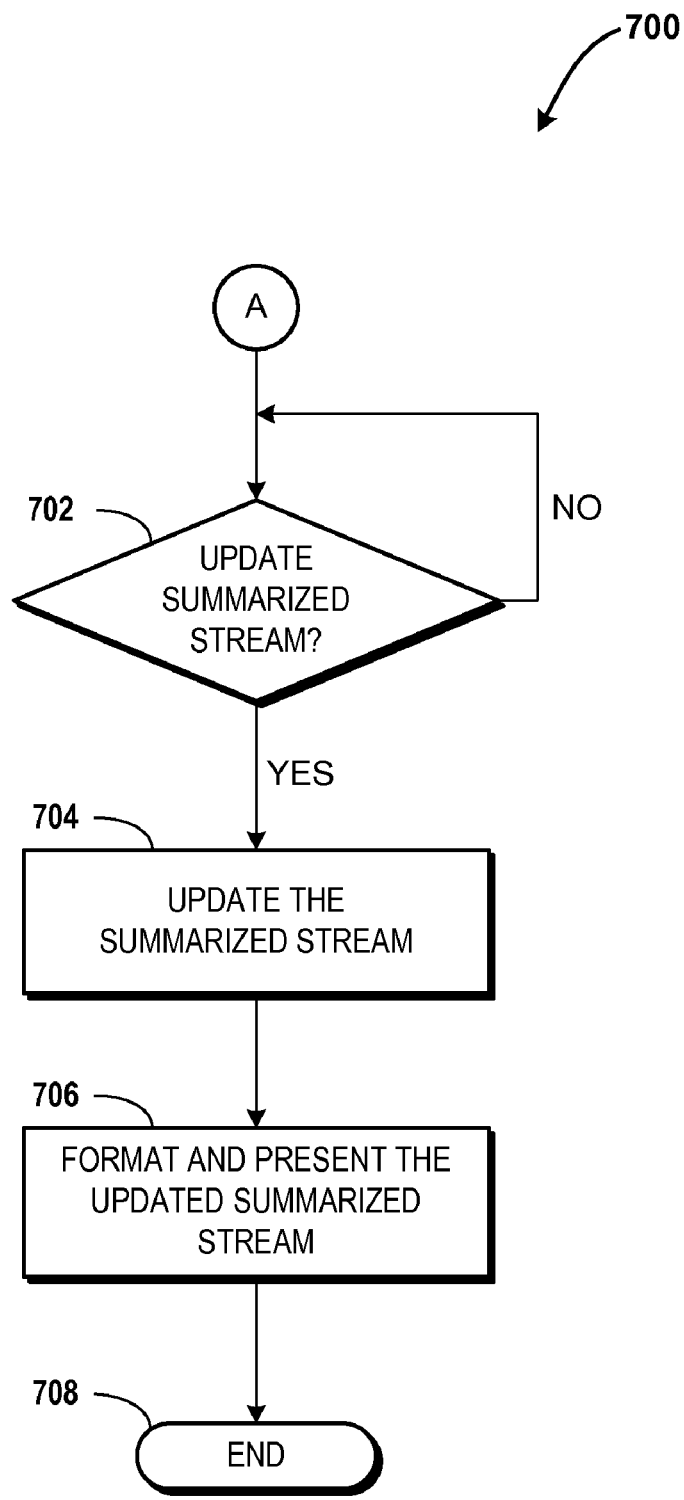
FIG. 7 is a flow diagram showing aspects of a method for updating summarized streams and presenting updated summarized streams, according to an exemplary embodiment of the present disclosure.

FIG. 7 illustrates a method 700 for updating a summarized stream 112 and presenting the updated summarized stream 112. The method 700 begins at operation 702, wherein the summarization engine 110 determines if the summarized stream 112 should be updated. The summarization engine 110 can determine that the summarized stream 112 should be updated in various ways. For example, the summarization engine 110 can be configured to update the summarized stream 112 after passage of a specified time, e.g., a certain number of seconds, minutes, hours, days, weeks, or the like.

Additionally, or alternatively, the summarization engine 110 can receive a request for additional information, as explained above. In some embodiments, a user can be updated by the summarization engine 110 when a trigger event occurs. For example, the summarization engine may be configured to review the stream 104 to identify trigger events. For example, the summarization engine 110 can recognize that a drastic change has occurred in the data. For example, the summarized stream 112 may relate to a political campaign of a candidate. If the candidate drops out of the race or campaign, a large amount of data relating to that change may be recognized, in which case the summarization engine 110 may update the summarized stream 112 to reflect that change. Thus, the operation 702 may include monitoring the stream 104 to recognize changes in the topic relating to the stream 104, when a comment that exceeds an interestingness threshold is created, when a particular source creates content relating to a particular topic, or when any data relating to a particular topic is created. These examples are merely illustrative and should not be construed as being limiting in any way.

Additionally, or alternatively, a user may subscribe to a service to obtain the summarized stream 112 according to certain intervals or dates. Thus, the summarization engine 110 can update the summarized stream 112 according to the terms of the subscription. These examples are merely illustrative, and should not be construed as being limiting in any way.

If the summarization engine 110 determines that the summarized stream 112 should not be updated, the method 700 returns to the beginning, and the summarization engine 110 can again consider whether to update the summarized stream 112. Although not illustrated in FIG. 7, it should be understood that before returning to the operation 702, the summarization may wait a specified amount of time, execute other operations, and the like. If the summarization engine 110 determines that the summarized stream 112 should be updated, the method 700 proceeds to operation 704.

At operation 704 the summarization engine 110 updates the summarized stream 112. The updating of the summarized stream 112 with respect to time and/or a filter was described above. With respect to receiving a request for additional data, the summarization engine 110 can obtain additional data corresponding to the stream 104 from a server 102 and/or the search engine 108. For example, the summarization engine 110 can transmit a request for updated or additional data relating to the stream 104 to the server 102 and/or the search engine 108.

In one embodiment, a user wishes to explore a particular entity in the summarized stream 112 in additional detail. As described above, the user may select this option by clicking on a cluster or a link therein for more information. Upon receiving an indication that additional data is desired, the summarization engine 110 generates the request for updated or additional data based upon words or phrases relating to one or more entities or clusters in the summarized stream 112. The summarization engine 110 transmits the request to the search engine 108, and the search engine 108 performs a search corresponding to the request and returns the data to the summarization engine or updates the stream 104. The summarization engine adds the data to the summarized stream 112 or provides the additional data to the user.

From operation 704, the method 700 proceeds to operation 706, wherein the summarization engine 110 formats and presents the updated data from the summarized stream 112 in a determined format. The summarization engine 110 can format and present the updated data in a manner similar to that described above with respect to FIG. 6. It should be understood that after updating the summarized stream 112, the summarization engine 110 can present the summarized stream 112 in the same configuration used to present the summarized stream 112 before updating the data associated therewith. Additionally, or alternatively, the summarized stream 112 can present the updated data associated with the summarized stream 112 in a different configuration from that used to present the summarized stream 112 before updating the data. The method 700 ends at operation 708.

In some embodiments of the present disclosure, streams 104 associated with geographic areas, towns, companies, and even large portions of the Internet and/or other networks, may be summarized. The summarization engine 110 can generate a summarized stream 112 relating to the Internet, for example, allowing a user to identify topics that are viewed as important or interesting on a global scale. Similarly, as mentioned above, entire social networks can be summarized, so a user can determine what kind of information is interesting to his or her social network at a particular time.

The functionality described herein may be used for various applications. For example, the summarization engine 110 may provide summaries of topics or streams 104 to supplement searches performed by search engines such as the search engine 108. The summarization engine 110 can provide the summaries of the topics or streams 104, which can include text, photos, video, audio, links, and the like. Thus, the summarized stream 112 can provide an overview of a stream 104, or of topics, keywords, people, social networks, data, and other information.

FIG. 8 illustrates an exemplary computer architecture 800 for a server 102 or computer 114 capable of executing the software components described herein for summarizing streams 104 as described above. The computer architecture 800 illustrated in FIG. 8 illustrates a conventional server, desktop, and/or laptop computer, and may be utilized to execute any aspects of the software components presented herein, including the search engine 108, the summarization engine 110, and/or other program modules.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814, and application programs.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media that can be accessed by the computer architecture 800.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800.

According to various embodiments, the computer architecture 800 may operate in a networked environment using logical connections to remote computers through a network such as the network 106. The computer architecture 800 may connect to the network 106 through a network interface unit 816 connected to the bus 810. It should be appreciated that the network interface unit 816 also may be utilized to connect to other types of networks and remote computer systems, for example, the server 102, the search engine 108, and/or the computer 114. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8).

As mentioned briefly above, a number of program modules and data files may be stored in the mass storage device 812 and RAM 806 of the computer architecture 800, including an operating system suitable for controlling the operation of the server, desktop, and/or laptop computer. The mass storage device 812 and RAM 806 also may store other types of program modules and data, including the stream 104 described above.

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Based on the foregoing, it should be appreciated that technologies for summarizing streams of information have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for summarizing a stream of information, the computer-implemented method comprising performing computer-implemented operations for:
   receiving, at a computer executing a summarization engine, data corresponding to the stream of information;
   identifying entities in the stream of information;
   grouping the data into clusters corresponding to the identified entities;
   summarizing the data in the clusters and defining a timeline relating to the data in the clusters;
   generating a summarized stream based, at least partially, upon the summarized data and the defined timeline;
   determining a format for presenting the summarized stream;
   formatting the summarized stream in accordance with the format; and
   outputting the summarized stream in the format.

2. The method of claim 1, wherein at least one of the entities comprises a topic addressed by the data corresponding to the stream of information.

3. The method of claim 1, wherein the summarizing further comprises:
   identifying a keyword occurring in the data in the clusters;
   analyzing the data in the clusters to determine a number of occurrences of the keyword in the data in the clusters; and outputting a number corresponding to the number of occurrences of the keyword in the data.

4. The method of claim 1, wherein the stream of information comprises data associated with a social networking service.

5. The method of claim 1, further comprising:
identifying social networks of users associated with the data;
receiving a command to apply a filter to the clusters to filter the data based upon the social networks of the users associated with the data; and
in response to receiving the command, filtering the data in the clusters based, at least partially, upon the identified social networks.

6. The method of claim 5, wherein the identifying the entities comprises identifying words occurring in the status updates, and identifying one of the entities as the words occurring in the status updates, and wherein grouping the data into the clusters comprises identifying each status update that comprises the words, and grouping each of the status updates that comprises the words into one of the clusters.

7. The method of claim 1, further comprising:
identifying times associated with the data;
receiving a command to apply a filter to the clusters to filter the data based upon the times associated with the data; and
in response to receiving the command, filtering the data in the clusters based, at least partially, upon the identified times.

8. The method of claim 1, wherein the stream of information comprises data associated with real-time messaging service.

9. The method of claim 8, wherein the data associated with the social networking service comprises a plurality of real time messages, wherein identifying the entities comprises identifying words occurring in the real-time messages and identifying one of the entities as the words occurring in the real-time messages, and wherein grouping the data into the clusters comprises identifying each real-time message that comprises the words and grouping each of the real-time messages that comprises the words into one of the clusters.

10. The method of claim 9, wherein the summarizing further comprises:
analyzing each of the real-time messages in the one of the clusters to identify a topic addressed in each of the real time messages; and
generating a summary of the real-time messages, the summary comprising an indication of each topic addressed in the real-time messages and an indication relating each of the topics to a time.

11. The method of claim 1, further comprising:
identifying locations associated with the data;
receiving a command to apply a filter to the clusters to filter the data based upon the locations associated with the data; and
in response to receiving the command, filtering the data in the clusters based, at least partially, upon the identified locations.

12. The method of claim 1, wherein the format comprises a timeline, and wherein the clusters are graphically represented on the timeline associated with a time at which the data in the clusters was created.

13. The method of claim 12, further comprising:
retrieving an updated version of the data in the stream;
updating the summarized stream to obtain an updated summarized stream reflecting the summarized stream and the updated version of the data in the stream;
formatting the updated summarized stream in accordance with the format; and
presenting the updated summarized stream in the format.

14. The method of claim 1, wherein the format comprises a tree diagram, wherein the clusters are graphically represented on the tree diagram, and wherein data relating to the clusters is graphically represented on the tree diagram and is accessible via selection of a user interface control to expand the tree.

15. The method of claim 1, further comprising:
retrieving an updated version of the data in the stream;
updating the summarized stream to obtain an updated summarized stream reflecting the summarized stream and the updated version of the data in the stream;
formatting the updated summarized stream in accordance with the format; and
outputting the updated summarized stream in the format.

16. A computer-implemented method for summarizing a stream of information, the computer-implemented method comprising performing computer-implemented operations for:
receiving, at a computer executing a summarization engine, data corresponding to the stream of information;
identifying entities in the stream of information, the entities comprising a topic addressed by data in the stream of information;
grouping the data into a clusters corresponding to the identified entities;
summarizing the data in the clusters and defining a timeline relating to the data in the clusters;
generating a summarized stream comprising a timeline associated with the clusters;
determining a format for presentation of the summarized stream;
formatting the summarized stream in accordance with the format; and
presenting the summarized stream in the format.

17. The method of claim 16, further comprising:
retrieving an updated version of the data in the stream;
updating the summarized stream to obtain an updated summarized stream reflecting the summarized stream and the updated version of the data in the stream;
formatting the updated summarized stream in accordance with the format; and
outputting the updated summarized stream in the format.

18. The method of claim 17, wherein the stream of information comprises data associated with a social networking service.

19. A computer-readable storage medium having computer-readable instructions stored thereupon that, when executed by a computer, cause the computer to:
receive data corresponding to the stream of information;
identify a plurality of entities in the stream of information, at least one of the plurality of entities comprising a topic of the data in the stream of information;
group the data into at least one cluster corresponding to the at least one of the plurality of identified entities;
summarize the data in the at least one cluster and defining a timeline relating to the data in the at least one cluster;
generate a summarized stream, the summarized stream comprising a summary of the data in the at least one cluster and a timeline relating to the data in the at least one cluster;
determine a format for presentation of the summarized stream;
format the summarized stream in accordance with the format;

present the summarized stream in the format;
retrieve an updated version of the data in the stream;
update the summarized stream to obtain an updated summarized stream reflecting the summarized stream and the updated version of the data in the stream;

format the updated summarized stream in accordance with the format; and
present the updated summarized stream in the format.

* * * * *